United States Patent [19]

Staffan

[11] 4,449,815

[45] May 22, 1984

[54] DIAZO COPIER

[76] Inventor: Hugh J. Staffan, 25525 Koontz, Roseville, Mich. 48066

[21] Appl. No.: 390,655

[22] Filed: Jun. 21, 1982

[51] Int. Cl.[3] .......................... G03D 7/00; G03B 27/30

[52] U.S. Cl. ........................................ 355/106; 354/300

[58] Field of Search ................ 355/106; 354/299, 300; 34/37, 79, 140

[56] References Cited

U.S. PATENT DOCUMENTS

| | | | |
|---|---|---|---|
| 4,059,409 | 11/1977 | Barto et al. | 354/300 X |
| 4,167,319 | 9/1979 | Feitzinger et al. | 354/300 |
| 4,273,435 | 6/1981 | Hewelt et al. | 355/106 X |
| 4,303,329 | 12/1981 | Michlin | 354/300 |
| 4,316,663 | 2/1982 | Fischer | 354/299 |
| 4,358,193 | 11/1982 | Hale | 354/299 |
| 4,371,247 | 2/1983 | Hewelt et al. | 355/106 X |

*Primary Examiner*—Richard A. Wintercorn
*Attorney, Agent, or Firm*—Barnes, Kisselle, Raisch, Choate, Whittemore & Hulbert

[57] ABSTRACT

A diazo copier having an exposure section, an ammonia developer section, a copy degassing section, and an enclosed copy receptacle. To develop an exposed copy, it is contacted with ammonia vapors in the development section. The ammonia vapors absorbed by the copy material are released by heating the copy to an elevated temperature in the degassing section from which the copy is deposited in the enclosed receptacle. The released ammonia vapors are removed from the copy by circulating a stream of air through the receptacle and around the copy.

4 Claims, 4 Drawing Figures

DIAZO COPIER

This invention relates to the making of photographs or photocopies with light sensitive diazo copy material and more particularly to diazo copiers.

In diazo copiers, the exposed copy material is developed by contact with ammonia vapor. Since the copy material is usually fiberous, it is permeated by and absorbs some of the ammonia vapor which is subsequently released when handling the developed copy after it has been removed from the copier. If several copies are produced, considerable ammonia vapor is released. Moreover, typically, some ammonia vapor leaks from the copier itself. This release into the atmosphere of highly pungent ammonia creates disagreeable and even occasionally unhealthy working conditions for persons in the vicinity of the copier.

In the past, many efforts have been made to prevent this release of ammonia vapor. A common approach to removing the ammonia vapor has been to pass the developed copy through an airstream in a degassing chamber and then pass the airstream through an absorber prior to discharging the airstream into the atmosphere outside of the building in which the copier is used. To accelerate the release of ammonia vapor from the copy, it is frequently heated as it passes through the degassing chamber. These prior approaches have not removed all of the ammonia from the copy and still result in an objectionable quantity of ammonia vapor being released from the copy when it is handled, particularly if several copies are made.

Usually, the copy is rised to an elevated temperature by mechanically forcing the copy into direct contact with a heated roller or platen. Often, this stresses the copy in such a way, that it is pleated, rippled, warped or otherwise undesirably distorted.

Objects features and advantages of this invention are to provide a diazo copier which removes essentially all ammonia vapor from the copies which it produces, allows essentially no ammonia vapor to escape to the atmosphere, eliminates the need for external venting of the copier, uses substantially less ammonia to develop a diazo copy, produces copies which are not pleated, warped or distorted, facilitates the handling of copies by receiving them in an enclosed receptacle from which they can be easily removed, and which is compact, rugged, durable and requires relatively little maintenance.

These and other objects features and advantages of this invention will be apparent from the following detailed description, appended claims, and accompanying drawings in which:

Figure 1:
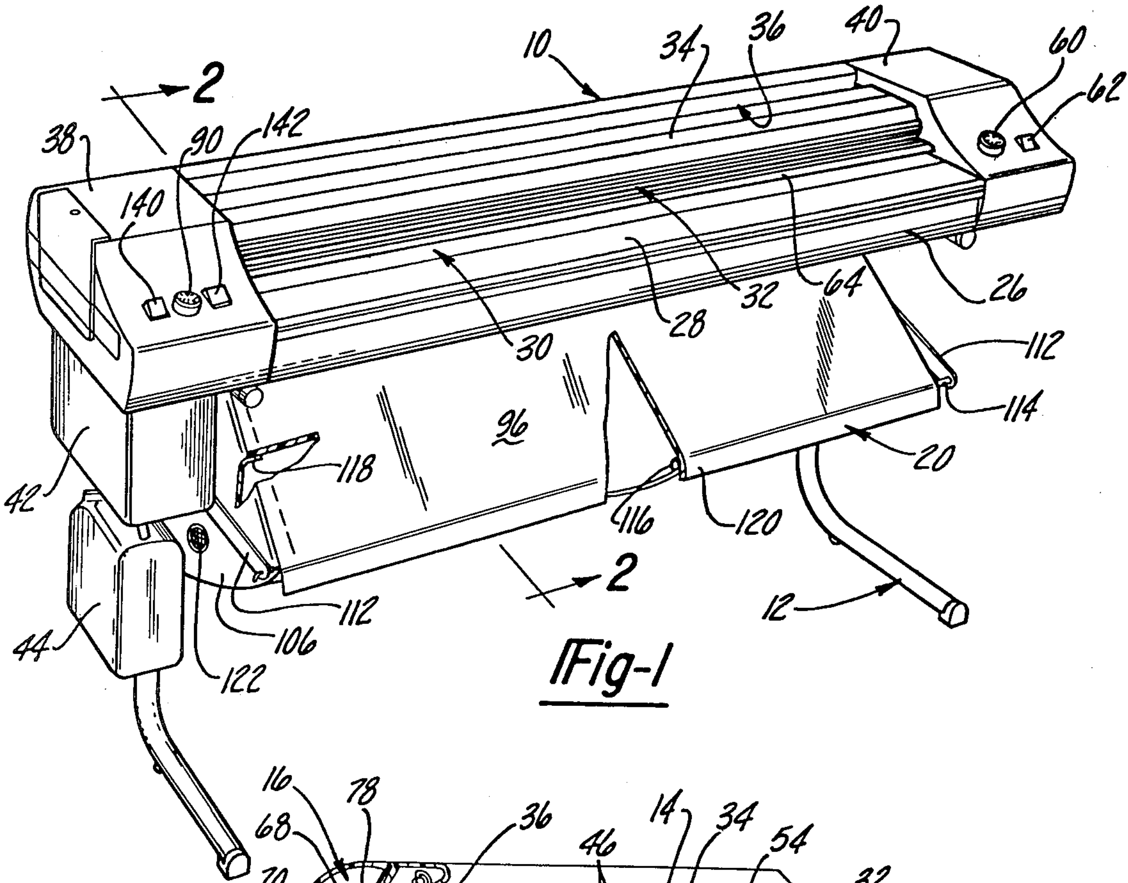
FIG. 1 is a perspective view of a diazo copier embodying this invention.

Referring in more detail to the drawings, FIG. 1 illustrates a diazo copier 10 embodying this invention received on a tubular stand 12. Copier 10 has an exposure mechanism 14, a developer 16, a degasser 18, and a copy receptacle 20 all carried by a base 22. A roll of unexposed diazo copy material can be received in a compartment 24 having a hinged front cover 26 releasably retained in the upright position by a magnetic catch (not shown).

An original document, such as a drawing, and an underlying sheet of unexposed diazo copy material, are fed into the exposure mechanism 14 over a work plate 28 and through a slot 30. They emerge from the exposure mechanism through a slot 32 and the exposed copy is fed into the developer 16 over a cover plate 34 and through a slot 36. The operating mechanism of the copier 10 is enclosed by end covers 38 and 40 releasably secured to the base 22. A filter box 42 is secured to the underside of the base adjacent one end and the handle of an ammonia container 44 is removably received on a hook connected to the base 22.

The exposure mechanism 14 has three fluorescent lights 46 mounted in parallel relationship by brackets 48 and extending longitudinally through a transparent tube of glass 50. The glass tube 50 is received in loops of a plurality of flat, endles webs or belts 52, each of which is disposed on a pair of drive rollers 54 and idler rollers 56. Tension is maintained on the belts by springs 58 (FIG. 4) connected to the ends of the shafts on which the idler rollers 56 rotate. The drive rollers 54 are driven by an electric motor (not shown) the speed of which is controlled by a combined electric or electronic on and off switch and speed control 60. The direction in which this motor rotates the belts and the glass tube is controlled by a forward and reverse switch 62. The insertion and removal of sheet material from the exposure mechanism is facilitated by a longitudinally extending divider bar 64 and a pick-off wiper or blade 66 of flexible material carried by the divider bar and engaging the glass tube.

An exposed diazo copy is developed by contact with ammonia vapor in the developer 16. The exposed copy is advanced through the developer 16 by a feed roller 68 which is driven in synchronization with the drive rollers 54 of the exposure mechanism by the same motor that drives the rollers 54. To accelerate development of the exposed copy, it is heated to an elevated temperature by contact with the feed roller 68 which is heated by an electric heater element 70. Preferably the peripheral surface of the feed rollers 68 is heated to a temperature in the range of about 140° F. to 150° F. The exposed copy is contacted by ammonia vapor which is received in a longitudinally extending chamber 72 defined by housing 74 and passes through a perforated screen 76 of teflon. The teflon screen 76 urges the copy material into firm engagement with the feed roller 68. Longitudinally extending seals 78 are disposed adjacent the upper and lower edges of the screen 76.

Ammonia vapor is produced in the container 44 and supplied to and circulated through the chamber 72 by a pump 80 (FIG. 3) and flexible tubes 82, 84 and 86. To generate ammonia vapor, the pump 80 through the tube 82 draws air from the chamber 72 and through the tube 84 bubbles the air into a liquid mixture of water and ammonia received in the container 44. The freshly generated ammonia vapor passes through the tube 86 into the chamber 72.

In accordance with a feature of this invention, only essentially the minimum quantity of ammonia vapor needed to develop an exposed copy is supplied by the pump 80 to the chamber 72. This is accomplished by operating the pump 80 only intermittently and preferably only when the developer feed roller and the exposure mechanism 14 are being operated by their drive motor. Intermittent operation of the pump 80 is achieved and controlled by an electronic control 88 having a variable duty cycle which is adjusted by turning a knob 90. Power is supplied to the variable duty cycle device 80 and hence to the pump 74 through an on-off switch 84. A satisfactory variable duty cycle device is commercially available from Robertshaw Controls Company of Indiana, Pa. 15701 as Part No. INF 120-134.

In accordance with another feature of this invention, to accelerate the release and removal of ammonia vapor from a developed copy of diazo material, the copy is heated to an elevated temperature as it advances through a longitudinally extending discharge slot or passage 92 of the degasser 18. The copy is heated by a longitudinally extending platen 94 having an electric resistance heater element 96 disposed therein. The exterior surface of the platen 94 in the passage 92 is heated to an elevated temperature which is preferably in the range 140° F. to 150° F. Usually, the copy contacts at least a portion of the platen 94 as it is advanced through the passage 92 by the feed roller 68. The copy is disengaged from the feed roller by a pick-off wiper or blade 98 preferably of flexible material extending longitudinally of and carried by the platen 94.

Figure 2:
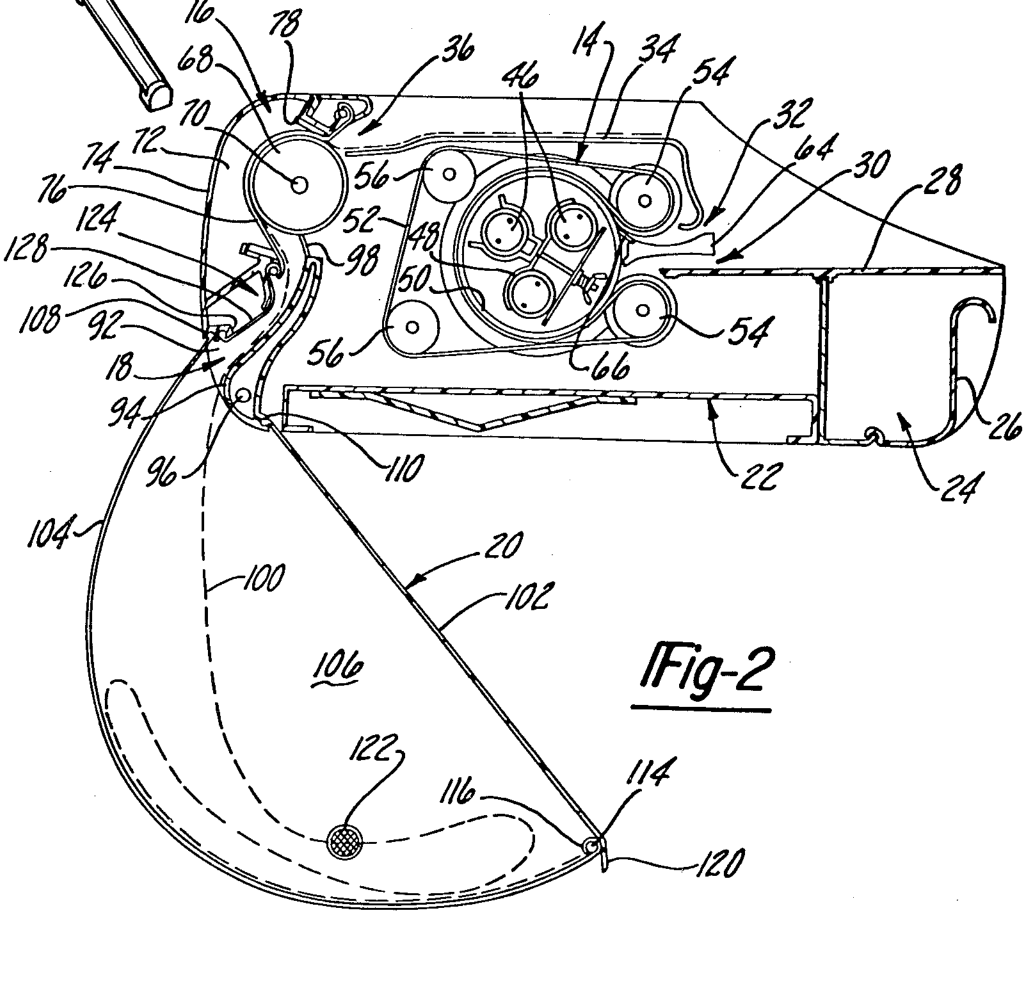
FIG. 2 is a sectional view taken generally on line 2—2 of FIG. 1.

In accordance with another feature of this invention and as shown in FIG. 2, as the copy is heated to an elevated temperature to release the ammonia vapor, it is deposited as shown in phantom at 100 in the enclosed receptacle 20 to prevent the ammonia vapor from escaping to the atmosphere of the room in which the copier is used. The receptacle 20 has a cover 102 a bottom wall 104 and a pair of end walls 106 each sealed adjacent its lower edge to the bottom wall. The receptacle 20 is connected adjacent its upper end to the outlet of passage 92 by receipt of beads on the upper edges 108 and 110 of the bottom wall and cover in complimentary and longitudinally extending grooves in the housing 74 and platen 94. The lower edge of the receptacle is supported by a pair of arms 112 secured to the stand 12 which carry a rod 114 received in a loop 116 formed in the lower edge of the bottom wall 104.

To provide an enclosed and sealed receptacle, the cover 102 normally lies in sealing engagement with inturned flanges 118 of the upper edges of the end walls 106 and the lower edge of the bottom wall 104. A copy may be readily manually removed from the receptacle by lifting the lower edge 120 of the cover which is returned to the position shown in FIGS. 1 and 2 after the copy is removed. Preferably the bottom, end walls and cover are made of a flexible material impervious to ammonia vapor such as sheets of polyurethane plastic.

In accordance with another feature of this invention and as shown in FIG. 2, essentially all ammonia vapor is removed from the receptacle 20 and the developed copy by moving air across and around the copy while it is being deposited in the receptacle and after it is received therein. To facilitate circulation of air across and around the copy it is deposited in the receptacle 20 in a pleated or overlapped and sinous pattern shown in phantom in FIG. 2. This pattern is achieved by making the bottom wall generally curved or arcuate and positioning it under the outlet of passage 92 so that the copy enters the receptacle adjacent its upper edge.

Air from the room in which the copier 10 is used is drawn into the receptacle 20 through inlet vents 122 in its end walls 106, around and across the developed copy shown in phantom at 100, into the passage 92 and through an exhaust chamber 124 extending longitudinally of the passage 92. The airstream enters the exhaust chamber 124 through a longitudinally extending inlet opening 126 covered by a screen 128 which preferably is of teflon, integral with the teflon sheet of the screen 76, and releasably secured to the housing 74.

Figure 3:
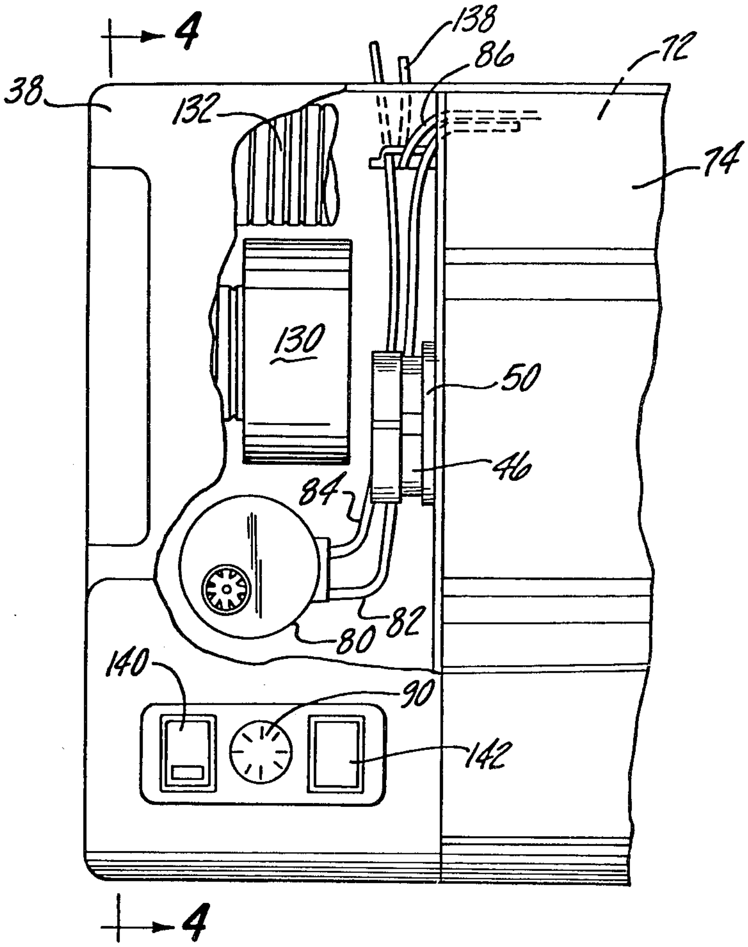
FIG. 3 is a fragmentary top view with portions broken away of the diazo copier of FIG. 1.
Figure 4:
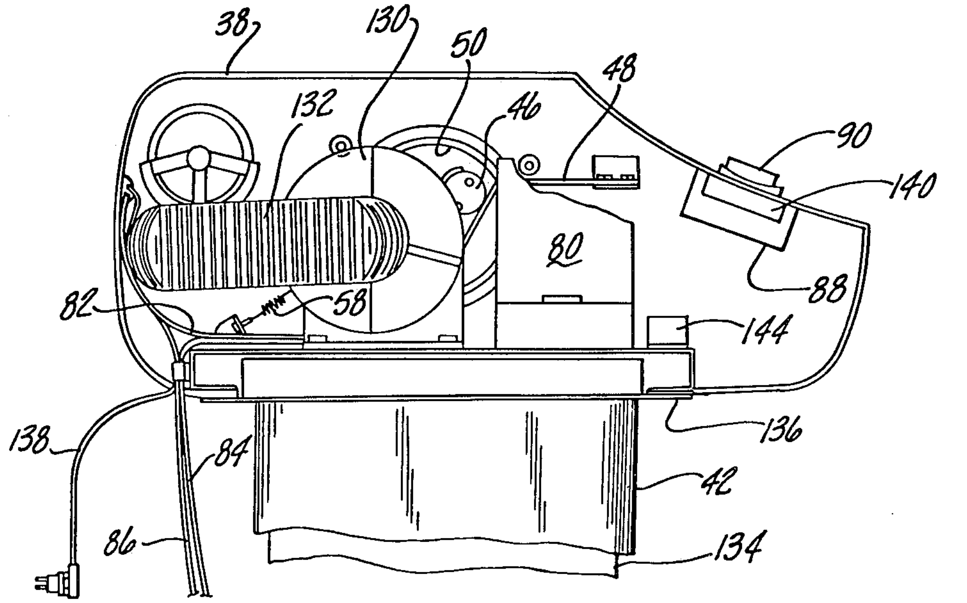
FIG. 4 is a fragmentary sectional view taken generally on line 4—4 of FIG. 3.

As shown in FIGS. 3 and 4, air is drawn through the receptacle 20 from vents 122 and into the exhaust chamber 124 by an exhaust fan or blower 130 connected by a flexible hose 132 to the exhaust chamber. The blower discharges this stream of air and any ammonia vapor therein into a filter 134 received in the filter box 42. The filter 134 removes the ammonia vapor from the air which is discharged into the atmosphere of the room in which the copier is used. To assure that all of the ammonia vapor is removed, the filter preferably includes activated carbon and sulfuric acid and is periodically changed or replaced with a new filter. The filter box 42 is releasably mounted on the underside of base 22 by a carrier plate 136 and cap screws (not shown) so that the filter 134 is in sealed relation with the outlet of the blower 130.

The amount of ammonia used to develop a copy is greatly reduced and hence, the frequency of changing the filter 134 greatly decreased, by the intermittent operation of the ammonia pump 74. This intermittent operation reduces the amount of ammonia in the airstream discharged into the filter while copies are being developed from 650 PPM to as low as 125 PPM depending on the setting of the control 88 while still producing copies of excellent quality.

Electric current is supplied to the copier through an electric plug and power line 138 connected to a main switch 140 which turns the power on and off. Power is supplied to the heater elements 66 and 90 in the developer feed roller and degasser platen directly from the main switch 140 so that they are turned on and off by this switch. Power is also supplied to the switch and electronic speed control 60 for the exposure and developer drive motor through the main switch 140. Thus, this drive motor may be operated whenever the main switch 140 is turned on.

Power is supplied to the fluorescent lights 46 and a cooling fan (not shown) through an on and off run switch 142 connected in series with the main switch 140. Power is also supplied to the variable duty cycle controller 88 and hence the ammonia pump 80 through the run switch 142.

In accordance with anoter feature of this invention, to be certain that all the ammonia vapor is removed from the developed copies, receptacle 20 and degasser passage 92, the blower 130 continues to run preferably for about one to two minutes after the run switch 142 is turned off to deenergize the ammonia pump 80 and the fluourescent lights 46. This is achieved by supplying power from the main switch 140 to the blower motor through the normally open contacts of a time delay relay 144. The coil of this time delay relay is connected to run switch 142 so that the blower motor is energized when the run switch is turned on and deenergized when this relay times out after the run switch is turned off.

To use copier 10, power cord 138 is plugged in and the main switch 140 is turned on which energizes the heater elements 66 and 90 for the developer feed roller 68 and the degasser platen 96. Preferably after the developer roller and platen reach their operating temperatures, the run switch 142 is turned on to energize the lights 46, and the cooling fan of the exposure section, the ammonia pump 80, and the ammonia exhaust blower 130. If needed, the knob 90 is turned to adjust the duty cycle of the controller 88 and hence the amount of ammonia vapor produced by the pump 80. The drive motor switch and speed control 60 is also turned on and adjusted to provide the desired speed or rate of feed of copy material through the copier and switch 62 is moved to the forward position so that copy material can be fed through the copies.

To make a copy of an original document such as a drawing, the leading edge of the document and an underlying unexposed sheet of copy material are placed on top of work plate 28 and fed through slot 30 into the developer section 14 so that they are received between the belts 52 and the glass tube 50. As they pass around the glass tube, the copy material is exposed by the light from fluorescent tubes 46 passing through the original document. When the leading edge of the orginal document and copy material emerge from slot 32, they are manually separated and the exposed copy is fed over the cover plate 34 through the slot 32 and into the developer 16 between the feed roller 68 and the screen 76. As the exposed copy passes around the feed roller, it is heated to an elevated temperature by the heat produced by electric resistance element 70 and contacted with ammonia vapor passing through the screen 76 from the chamber 72 to develop the copy. The ammonia vapor in chamber 72 is produced by the pump 80 bubbling air through a liquid ammonia and water mixture received in the container 40.

After being contacted with ammonia, the developed copy passes through the degasser passage 92 and is deposited in the receptacle 20 in the overlapping and sinuous pattern indicated in phantom at 100. Release of ammonia vapor from the developed copy is accelerated by heating the copy to an elevated temperature with the heat produced by heater element 96 in the platen 94. To assure that essentially all of the ammonia is removed from the copy and that none of the ammonia vapor escapes into the room in which the copier 10 is used, the blower 130 draws a stream of air through the vents 122 in the receptacle 20, across and around the developed copy 100, through the lower portion of the degasser passage 92, and through the exhaust chamber 124. The airstream and ammonia vapor is discharged by the blower 130 into the filter 134 received in the filter box 42. The filter 134 removes the ammonia vapor from the stream of air which is discharged into the room in which the copier is used.

After the copies are produced, the run switch 142 is usually turned off which deenergizes the fluorescent lights 46 and the fan of the exposure section, the ammonia pump 80, and the coil of the time delay relay 144 controlling the motor of the exhaust blower 130. When this relay times out, its contacts open to turn off the motor of the blower 130. This delay in turning off the blower motor assures that all of the ammonia vapor is exhausted from the copier.

The developed copies are manually removed from the receptacle 20 by lifting the lower edge 120 of the cover 102, withdrawing the copies, and returning the cover to its closed position. If the copier 10 will not be used for several hours, such as after a normal work period, the main switch 140 is usually turned off which deenergizes the entire copier including the heater elements 68 and 96 for the developer feed roller and the degasser platen.

I claim:

1. In a machine for developing light sensitive copy material by contact with ammonia developing gasses having a developer chamber constructed and arranged to contact light sensitvie copy material with ammonia gasses to develop such copy material, a pump driven by an electric motor and constructed and arranged to deliver ammonia gasses to said developer chamber when operated by said electric motor, a degasser passage constructed and arranged for developed copy material to pass through after being contacted with the ammonia developing gasses, heater means cooperating with said degasser passage and constructed and arranged to heat the developed copy material to an elevated temperature to accelerate the release of ammonia vapor from the copy material, the improvement comprising an enclosed receptacle communicating with said degasser passage and constructed and arranged to receive developed copy material from said degasser passage, said receptacle having an outlet which can be opened and closed and when opened through which developed copy material can be removed from said receptacle, at least one air inlet communicating with the interior of said receptacle, said pump having sufficient capacity when continuously operated by said electric motor to supply a greater quantity of ammonia gasses to said developer chamber than the minimum quantity of ammonia gasses required to develop such copy material, a control device connected with said electric motor, said control device having a variable duty cycle and being constructed and arranged to intermittently operate said electric motor to intermittently drive said pump such that only essentially the minimum quantity of ammonia gasses needed to develop such copy material can be supplied by said pump to said developer chamber, and a blower constructed and arranged to move a stream of air through said inlet, around developed copy material in said receptacle and through at least a portion of said degasser passage adjacent said heater means such that essentially all ammonia is removed from developed copy material received in said receptacle before such developed copy material is removed from said receptacle.

2. In the machine of claim 1 the improvement wherein said control device comprises an electronic control having a variable duty cycle which can be manually adjusted.

3. In the machine of claim 1 the improvement which also comprises an electric light constructed and arranged to expose at least portions of such copy material, an on and off switch connected to said light and said electric motor of said pump to control the supply of electric current to said light and pump motor, a second electric motor constructed and arranged to drive said blower, and a time delay control connected with said second electric motor and constructed and arranged to supply current to said second electric motor to drive said blower for a predetermined period of time after said switch is turned off the deenergize said pump motor and light.

4. In the machine of claim 3 the improvement wherein said time delay control comprises a time delay relay device.

* * * * *